United States Patent [19]

Evans

[11] 4,079,643
[45] Mar. 21, 1978

[54] WRENCH AND RATCHETING BOLT

[76] Inventor: James P. Evans, 3233 SW. 23 St., Oklahoma City, Okla. 73108

[21] Appl. No.: 760,079

[22] Filed: Jan. 17, 1977

[51] Int. Cl.² .............................................. B25B 13/48
[52] U.S. Cl. ............................................. 81/71; 85/45
[58] Field of Search ................................. 81/71; 85/45

[56] References Cited

U.S. PATENT DOCUMENTS

| 1,138,572 | 5/1915 | Kaylor | 81/119 |
| 1,378,160 | 5/1921 | Woodville | 81/121 B |

FOREIGN PATENT DOCUMENTS

| 1,361,750 | 4/1964 | France | 81/119 |
| 763,737 | 8/1951 | Germany | 85/45 |

Primary Examiner—James L. Jones, Jr.
Attorney, Agent, or Firm—Head, Johnson & Chafin

[57] ABSTRACT

A wrench and ratcheting bolt therefor, having no moving parts, said wrench having the outer periphery of one end thereof shaped in the form of a hexagon and the outer periphery of the other end shaped in the form of a pair of hexagons sharing a common side. The bolt for use with said wrench having an irregularly shaped recess in the head thereof for receiving either end of the wrench and permitting a ratcheting effect when threading or unthreading the bolt with the hexagonally shaped wrench end.

8 Claims, 16 Drawing Figures

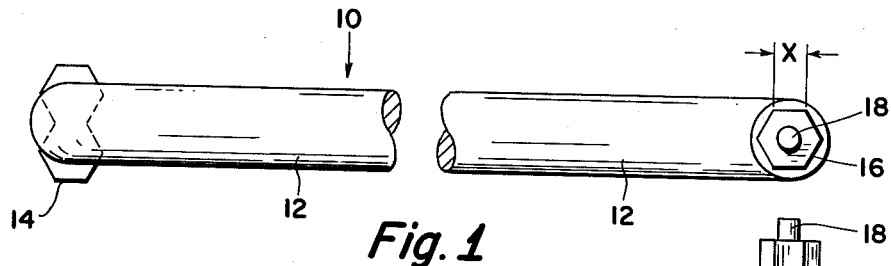
Fig. 1
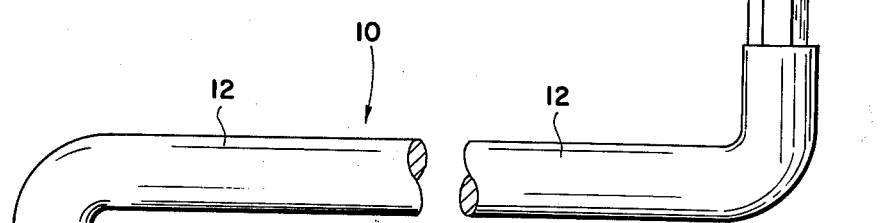
Fig. 2
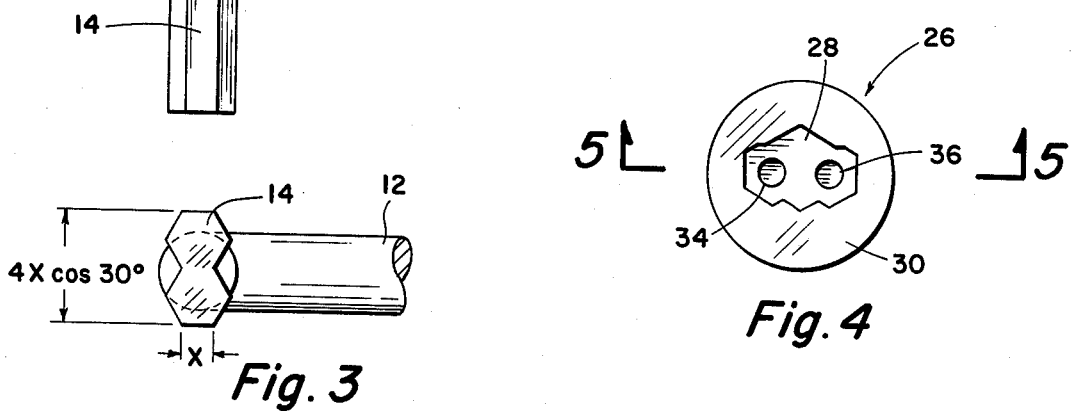
Fig. 3
Fig. 4
Fig. 5
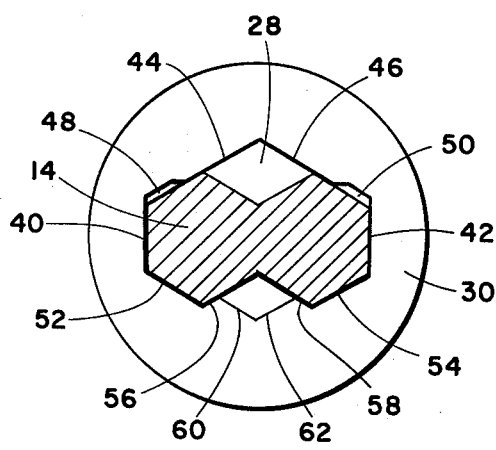
Fig. 6

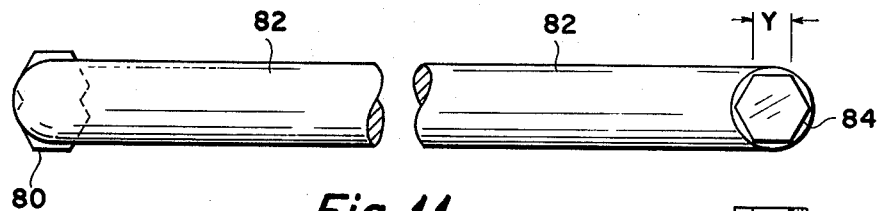
Fig. 11
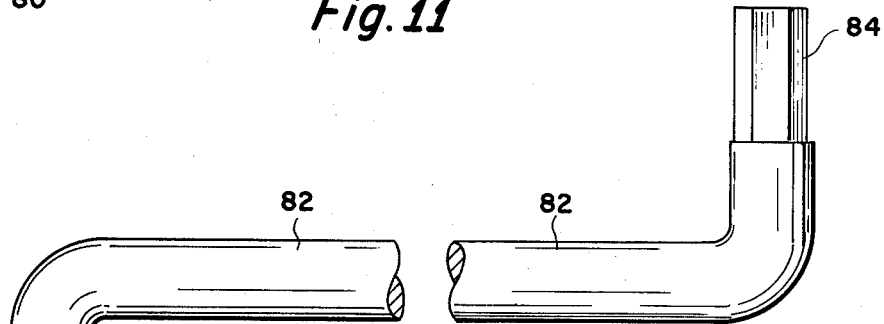
Fig. 12
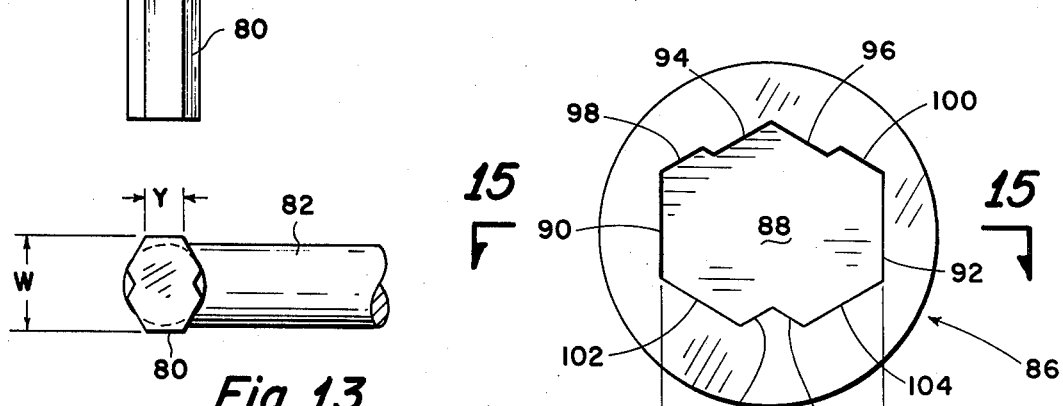
Fig. 13
Fig. 14
Fig. 15
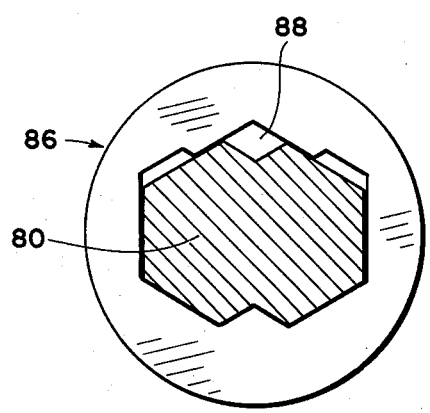
Fig. 16

WRENCH AND RATCHETING BOLT

BACKGROUND OF THE INVENTION

Ratcheting wrenches, having no moving parts, have been disclosed in the prior art for use with standard bolts and fittings. A ratcheting wrench is disclosed for hexagonal members in U.S. Pat. No. 3,620,107, issued to James P. Evans, and for octagonal members in U.S. Pat. No. 3,881,377, issued to James P. Evans and Calvin G. Turner. In each of the above patents and patents issued for similar-type devices, the wrench working surfaces have slipping notches embodied therein to achieve a ratcheting effect. Said notches allow the wrench head to be reversed in direction of turn without a corresponding application of reverse torque to the threaded member.

None of the known teachings of the prior art, however, suggest or disclose the embodiment of the slipping notches in the threaded member rather than in the wrench.

SUMMARY OF THE INVENTION

The present invention contemplates a novel wrench and ratcheting bolt therefor. The wrench has the cross-sectional area of one end thereof formed in the shape of a hexagon having sides of length $x$ and the cross-sectional area of the other end formed in the shape of a pair of hexagons sharing a common side, each hexagon having sides of length $x$. The bolt has a substantially centrally disposed recess in the head thereof shaped for receiving either end of said wrench.

The surfaces of the bolthead forming the recess have a pair of parallel opposing sides of length $x$, the perpendicular distance therebetween substantially equal to the width of the bi-hexagonal wrench end which by simple trigonometry is $4x$ cosine 30°. A second pair of sides of length greater than $x$ extend towards each other from adjacent ends of the parallel opposing sides at 120° angles therewith. A pair of concave slipping notches of length less than X are formed in the second pair of sides, beginning at the junctures of said sides with the parallel opposing sides. A third pair of sides, of length $x$, extend towards each other from the other ends of the parallel opposing sides, at angles of 120°. A fourth pair of sides, of length less than $x$, extend at angles of 120° from the ends of the third pair of sides, towards each other. A fifth pair of sides extend towards each other from the sides of length less than $x$, to form a concave V-shaped notch completing the recess perimeter.

The unique arrangement of the sides of the bolt recess perimeter and the notches therein permit use of the hexagonal wrench end in threading or unthreading the bolt in a ratcheting manner. If external space limitations permit, the bi-hexagonal wrench end may be used for either normal or heavy torqueing of the bolt.

In a second embodiment of the invention, one end of the wrench has the cross-sectional shape of a hexagon, and the cross-sectional shape of the other end is in the form of a pair of hexagons overlapping along mutually parallel sides. This configuration permits reduction of the width between parallel opposing sides of the bolt recess; and as a result of the width reduction, the fourth pair of sides, of length less than $x$, meet to complete the recess perimeter, thus obviating the need for the concave notch formed by the fifth pair of sides in the first embodiment.

BRIEF DESCRIPTION OF THE DRAWINGS

FIGS. 1 and 2 of the drawings are elevational views of one preferred embodiment of the wrench to be used in the invention.

FIG. 3 of the drawings is an elevational view of the bi-hexagonal end of said wrench.

FIG. 4 of the drawings is an elevational view of one preferred embodiment of the bolt for use in the invention.

FIG. 5 is an elevational view partly in cross-section of the bolt along line 5—5 of FIG. 4.

FIG. 6 shows a cross-sectional view of the bolthead through the main recess therein in relationship to the bi-hexagonal wrench end when inserted therein.

FIGS. 11 and 12 are elevational views of a second preferred embodiment of the wrench.

FIG. 13 is an elevational view of the overlapping bi-hexagonal wrench end of said second embodiment.

FIG. 14 illustrates the bolthead and the shape of the recess therein for use with the wrench shown in FIGS. 11 through 13.

FIG. 15 is an elevational view partly in section of said bolt taken along line 15—15 of FIG. 14.

FIG. 16 shows a cross-sectional view of the bolthead through the main recess therein in relationship to the bi-hexagonal wrench end when inserted therein.

DESCRIPTION OF THE PREFERRED EMBODIMENTS

Figure 7:
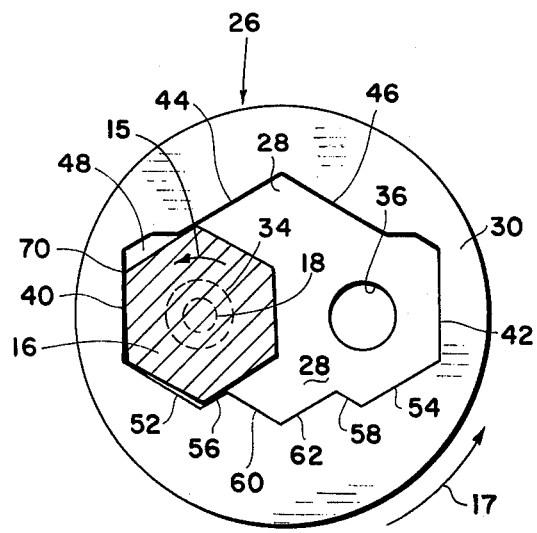
FIG. 7 shows the hexagonal wrench end positioned in the bolt recess for counter-clockwise torqueing of the bolt.

Referring to the drawings, and in particular to FIGS. 1 and 2 thereof, there are shown elevational views of a wrench, generally indicated by reference character 10, suitable for use in one preferred embodiment of the invention. The wrench body 12 may be of any desired length for imparting sufficient torque to the wrench ends 14 and 16 thereof. Wrench end 14, more clearly shown in FIG. 3, has the cross-sectional configuration of a pair of hexagons sharing a common side, each side of the bi-hexagonal shape having length $x$ and the overall width of the bi-hexagonal shape having the length, $4x$ cosine 30°. Although the end 14 is shown with the shared bi-hexagonal side in parallel alignment with the wrench body 12, the particular alignment shown is of little significance. The main body of wrench end 16 is hexagonal in cross-section shape, having sides of length $x$. A centrally disposed cylindrical guide post 18 of small diameter in comparison to the overall size of the hexagonal end is secured to wrench end 16 in coaxial alignment therewith for purposes which will be explained later. Wrench ends 14 and 16 are shown in the drawings of the preferred embodiment as being preferably disposed at 90° angles to the wrench body 12 for attaining maximum torqueing leverage.

FIG. 4 shows a top elevational view of a bolt, suitable for use with wrench 10, said bolt being generally indicated by reference character 26. FIG. 5 is a side view of bolt 26, partly in section, taken along line 5—5 of FIG. 4. A substantially centrally disposed main recess 28 is located at the head 30 of said bolt, and the stem or shank 32 of said bolt is threaded. Cylindrical guide slots 34 and 36 of larger diameter than guide post 18 are located in the bolthead surface 38 bounding the bottom of recess 28.

FIG. 6 of the drawings presents an enlarged cross-sectional view of the bolthead 30 along line 6—6 of FIG. 5, with the bi-hexagonal wrench end 14 inserted therein. As shown in said FIG. 6, the perimeter of recess 28 is bounded by a pair of opposing parallel sides 40 and 42, each side of length $x$, separated at a perpendicular distance at $4x$ cosine 30°, the overall width of the bi-hexagonal wrench end 14. Surfaces 44 and 46, each of length greater than $x$, extend from adjacent ends of the opposing parallel sides at 120° angles, towards each other. Surfaces 44 and 46 each have concave slipping notches, 48 and 50, of length less than $x$, beginning at the junctures between said surfaces and the opposing parallel surfaces 40 and 42. A pair of sides 52 and 54, each of length $x$, extend from the other ends of parallel sides 40 and 42 at angles of 120° therewith towards each other. A pair of sides 56 and 58, of length less than $x$, extend at angles of 120° from the ends of sides 52 and 54 towards each other. Sides 60 and 62 extend towards each other from the ends of sides 56 and 58 to form a concave V notch and complete the recessed perimeter. While each of the recessed side lengths, where important, have been described in terms of the length of the sides of the wrench ends, it is to be understood that each of said lengths would necessarily be slightly greater for ease in using the invention.

Contact between the surfaces of the bi-hexagonal wrench end and the bolt recess surfaces as shown in FIG. 6 permit the bi-hexagonal end to be used for heavy torqueing if the location of the bolt is such that half revolutions may be made with the wrench handle.

It is apparent that the bi-hexagonal end cannot be used if working space limitations do not permit 180° movement of the wrench. In such situations, the hexagonal end 16 of the wrench may be used in a ratcheting manner.

Figure 8:
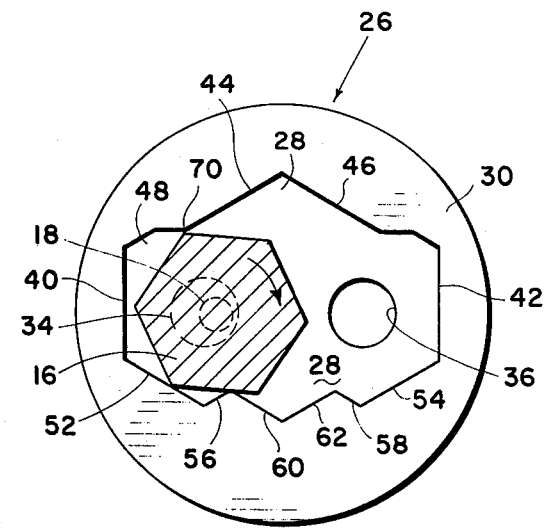
FIG. 8 shows the ratcheting movement of the hexagonal wrench end from the counter-clockwise torqueing position.

As shown in FIG. 7, the wrench hexagonal end 16 of wrench 10 is inserted in the left-hand side of the recess 28. In such position, a counter-clockwise movement of the hexagonal wrench end 16, as indicated by the arrow 15, will produce a like motion of the bolt as indicated by arrow 17. Reversing the direction of turn of the wrench hexagonal end as shown in FIG. 8 causes the hexagonal wrench end to pivot initially about the juncture point of surfaces 56 and 60, as slipping notch 48 permits movement of point 70 of the hexagonal end. The wrench hexagonal end may thus be rotated in a clockwise direction without removing the wrench end from the recess in a ratcheting fashion in order to regrip the bolt recess surfaces for continued counter-clockwise torqueing of the bolt. Wrench guide post 18 remains positioned in the bolt cylindrical slot 34 throughout the ratcheting and torqueing movements to help station the wrench hexagonal end in relatively close position to the proper recess working surfaces.

Figure 9:
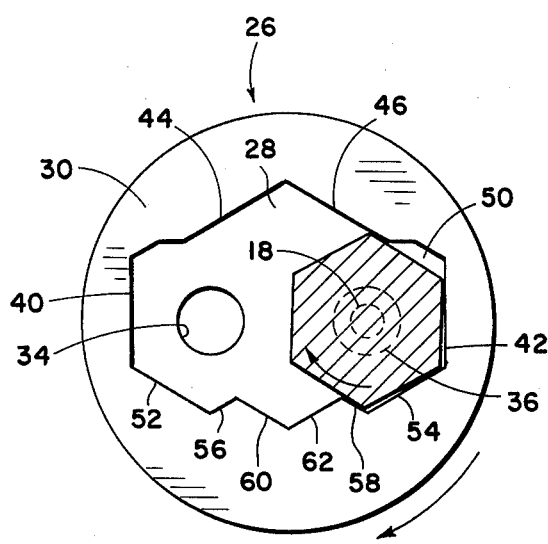
FIG. 9 shows the hexagonal wrench end inserted in the bolt recess for clockwise torqueing of the bolt.
Figure 10:
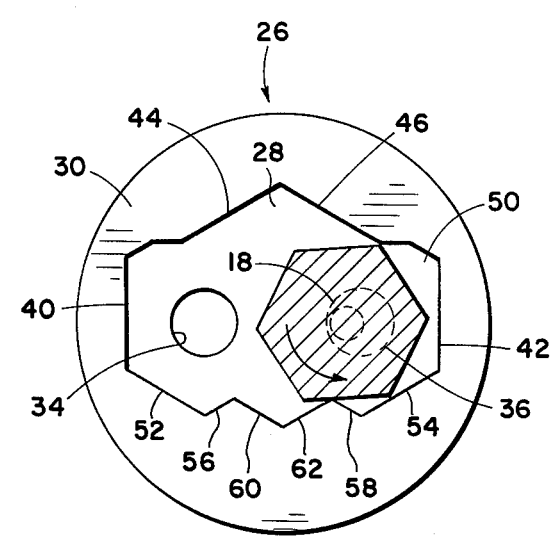
FIG. 10 shows the ratcheting movement of the hexagonal wrench end from the clockwise torqueing position.

In FIG. 9, the hexagonal end 16 of wrench 20 is shown inserted in the right-hand side of recess 28. In such position, a clockwise movement of the hexagonal wrench end 16 will produce a like motion of the bolt. Rotation of the hexagonal end 16 in the opposite direction produces the ratcheting effect explained above as the hexagonal end pivots about the juncture point of sides 58 and 62.

A second preferred embodiment of the invention is shown in FIGS. 11 through 15. In this embodiment, as shown by FIGS. 11 through 13, wrench end 80, attached to wrench body 82, has the cross-sectional configuration of a pair of hexagons, each having sides of length $y$, overlapping along parallel sides and having an overall width of length "$w$", said "$w$" being less than $4y$ cosine 30°. Wrench end 84 is in the shape of a hexagon, with sides of length $y$. As in the previous embodiment, the wrench ends are disposed at 90° angles to the wrench body 82 for attaining maximum torqueing efficiency.

FIG. 14 shows a top elevational view of a bolt 86 for use with the above-described wrench, having a substantially centrally disposed recess 88. As shown in said FIGURE, the perimeter of said recess 88 is bounded by a pair of opposing parallel sides 90 and 92, each of length $y$, separated at perpendicular distance substantially equal to the overall width "$w$" of wrench end 80. Surfaces 94 and 96, each of length greater than $y$, extend from adjacent ends of the parallel opposing sides at 120° angles therewith towards each other. Surfaces 94 qnd 96 have concave slipping notches 98 and 100 therein, of length less than $y$, beginning at the junctures between said surfaces and the parallel opposing surfaces 90 and 92. A pair of sides 102 and 104, each of length $y$, extend from the other ends of parallel opposing sides 90 and 92 at angles 120° therewith towards each other. A pair of sides 106 and 108 of length preferably less than one half $y$ extend at angles 120° from the ends of surfaces 102 and 104 towards each other to complete the recess perimeter.

It should be observed that by overlapping of the paired hexagons, the overall width of the recess is reduced, and the V-shaped notch formed by surfaces 60 and 62 as shown in FIG. 6 for the first embodiment is no longer required, as the pivot point for the hexagonal wrench end in the second preferred embodiment is the same for ratcheting in either direction and is formed by the juncture of sides 106 and 108.

Guide means (not shown) such as a guide post and cylindrical slot, may be also used with the second preferred embodiment as described for the first embodiment.

Whereas the present invention has been described in particular relation to the drawings attached hereto, it should be understood that other and further modifications, apart from those shown or suggested herein, may be made within the spirit and scope of this invention.

What is claimed is:

1. A ratcheting bolt and wrench therefor, which comprises:

a wrench having the cross-sectional shape of one end thereof in the form of a hexagon, and the cross-sectional shape of the other end thereof in the form of a pair of hexagons sharing a common side; and a bolt having substantially centrally disposed means in the head thereof for engaging four consecutive sides of the hexagonal wrench end when turning said bolt in a clockwise or counter-clockwise direction with said hexagonal wrench end and for allowing a ratcheting effect with said hexagonal wrench end and for engaging eight consecutive sides of the bi-hexagonal wrench end when turning said bolt in a clockwise or counter-clockwise direction with said bi-hexagonal wrench end.

2. A ratcheting bolt and wrench therefor, as recited in claim 1, further comprising:
   guide means for stationing said hexagonal wrench end in close position to the bolt surfaces forming the recess means.

3. A ratcheting bolt and wrench therefor, which comprises:
   a wrench having the cross-sectional shape of one end thereof in the form of a hexagon with sides substantially of length $x$; and
   a bolt having a recess in the head thereof for receiving said hexagonally shaped wrench end, the surfaces of said bolt forming the recess perimeter having a first pair of parallel opposing sides of length $x$, the perpendicular distance therebetween substantially equal to $4x$ cosine 30°, and having a second pair of sides, of length greater than $x$, extending towards each other from adjacent ends of the parallel opposing sides at angles of 120°, and having a third pair of sides, of length $x$, extending towards each other from the remaining adjacent ends of the parallel opposing sides at angles of 120°, and having a fourth pair of sides, of length less than $x$, extending towards each other from the ends of the third pair of sides, and having a pair of concave slipping notches, of length less than $x$, in the second pair of sides, said slipping notches beginning at the juncture of the first and second pair of sides and having a concave pivot notch between the fourth pair of sides.

4. A ratcheting bolt and wrench therefor, as recited in claim 3, wherein said wrench has the cross-sectional shape of the other end thereof in the form of a pair of hexagons sharing a common side, each of said hexagons having sides substantially of length $x$.

5. A ratcheting bolt and wrench therefor, as recited in claim 4, further comprising:
   guide means for stationing the hexagonal wrench end in close position to the bolt surfaces forming the recess sides.

6. A ratcheting bolt and wrench therefor which comprises:
   a wrench having the cross-sectional shape of one end thereof in the form of a hexagon, with sides substantially of length $y$; and
   a bolt having a recess in the head thereof for receiving the hexagonal end of said wrench, the surfaces of said bolt forming the recess perimeter having a first pair of parallel opposing sides of length $y$, the perpendicular distance therebetween less than $4y$ cosine 30°, and having a second pair of sides, of length greater than $y$, extending towards each other from adjacent ends of the parallel opposing sides at angles of 120°, and having a third pair of sides, of length $y$, extending towards each other from the adjacent ends of the parallel opposing sides at angles 120°, and having a fourth pair of sides, of length less than $y$, extending to each other from the ends of the third pair of sides, and having a pair of concave slipping notches of length less than $y$ in the second pair of said slipping notches beginning at the juncture of the first and second pair of sides.

7. A ratcheting bolt and wrench therefor, as recited in claim 6, wherein said wrench has the cross-sectional shape of the other end thereof in the form of a pair of hexagons, each hexagon with sides substantially of length $y$, overlapping along parallel sides.

8. A ratcheting bolt and wrench therefor, as recited in claim 7, further comprising:
   guide means for stationing said hexagonal wrench end in close position to the bolt surfaces forming the recess sides.

* * * * *